(12) United States Patent
Kim et al.

(10) Patent No.: US 11,831,041 B2
(45) Date of Patent: Nov. 28, 2023

(54) BATTERY CELL CONNECTOR AND BATTERY CELL STRUCTURE INCLUDING BATTERY CELLS CONNECTED TO EACH OTHER USING THE SAME

(71) Applicant: LG Chem, Ltd., Seoul (KR)

(72) Inventors: Yong Han Kim, Daejeon (KR); Pil Kyu Park, Daejeon (KR); Joo Hwan Sung, Daejeon (KR); Cheon Hee Bok, Daejeon (KR)

(73) Assignee: LG Energy Solution, Ltd.

( * ) Notice: Subject to any disclaimer, the term of this patent is extended or adjusted under 35 U.S.C. 154(b) by 344 days.

(21) Appl. No.: 17/265,677

(22) PCT Filed: Dec. 10, 2019

(86) PCT No.: PCT/KR2019/017406
§ 371 (c)(1),
(2) Date: Feb. 3, 2021

(87) PCT Pub. No.: WO2020/130464
PCT Pub. Date: Jun. 25, 2020

(65) Prior Publication Data
US 2021/0320384 A1    Oct. 14, 2021

(30) Foreign Application Priority Data
Dec. 18, 2018 (KR) .................. 10-2018-0164151

(51) Int. Cl.
*H01M 50/503* (2021.01)
*H01M 50/559* (2021.01)
(Continued)

(52) U.S. Cl.
CPC ....... *H01M 50/503* (2021.01); *H01M 50/213* (2021.01); *H01M 50/244* (2021.01);
(Continued)

(58) Field of Classification Search
CPC .. H01M 50/503; H01M 50/50; H01M 50/559; H01M 50/264; H01M 50/244; H01M 50/213
See application file for complete search history.

(56) References Cited

U.S. PATENT DOCUMENTS

| 5,900,332 A | 5/1999 | Marukawa et al. |
| 6,120,564 A | 9/2000 | Marukawa et al. |

(Continued)

FOREIGN PATENT DOCUMENTS

| CN | 1177844 A | 4/1998 |
| CN | 101165945 A | 4/2008 |

(Continued)

OTHER PUBLICATIONS

CN102751456 translation (Year: 2012).*

(Continued)

*Primary Examiner* — Jane J Rhee
(74) *Attorney, Agent, or Firm* — Lerner David LLP (57) ABSTRACT

Disclosed is a battery cell connector formed so as to have a general hexahedral shape, the battery cell connector including a lower mounting unit, in which a lower part of a cylindrical battery cell is mounted, an upper mounting unit, in which an upper part of another cylindrical battery cell is mounted, and a connection unit formed at a front surface, a rear surface, a left surface, and a right surface of the battery cell. The connection unit being configured to electrically and physically connect the battery cell connector to another battery cell connector, wherein the lower mounting unit, the upper mounting unit, and the connection unit are electrically connected to each other in the battery cell connector.

9 Claims, 9 Drawing Sheets

(51) Int. Cl.
   *H01M 50/50* (2021.01)
   *H01M 50/264* (2021.01)
   *H01M 50/244* (2021.01)
   *H01M 50/213* (2021.01)

(52) U.S. Cl.
   CPC ......... *H01M 50/264* (2021.01); *H01M 50/50* (2021.01); *H01M 50/559* (2021.01)

(56) References Cited

U.S. PATENT DOCUMENTS

| | | |
|---|---|---|
| 2008/0090136 A1 | 4/2008 | Kim et al. |
| 2008/0096104 A1 | 4/2008 | Kim |
| 2009/0092894 A1 | 4/2009 | Kim |
| 2010/0105239 A1 | 4/2010 | Li et al. |
| 2011/0269011 A1* | 11/2011 | Park ................... H01M 50/171 429/158 |
| 2013/0316202 A1 | 11/2013 | Bang et al. |

FOREIGN PATENT DOCUMENTS

| | | |
|---|---|---|
| CN | 101369649 A | 2/2009 |
| CN | 101409358 A | 4/2009 |
| CN | 102122723 A | 7/2011 |
| CN | 102237506 A | 11/2011 |
| CN | 102751456 A | 10/2012 |
| CN | 204760463 U | 11/2015 |
| EP | 2385566 A1 | 11/2011 |
| JP | 2002352786 A | 12/2002 |
| JP | 2005123069 A | 5/2005 |
| JP | 2009188095 A | 8/2009 |
| JP | 2010086965 A | 4/2010 |
| JP | 2010232102 A | 10/2010 |
| JP | 2015191731 A | 11/2015 |
| KR | 20060012786 A | 2/2006 |
| KR | 20090036293 A | 4/2009 |
| KR | 20100036992 A | 4/2010 |
| KR | 20110037543 A | 4/2011 |
| KR | 20120107371 A | 10/2012 |
| KR | 20130030545 A | 3/2013 |
| KR | 20140058289 A | 5/2014 |
| KR | 20180037409 A | 4/2018 |
| KR | 20180090516 A | 8/2018 |
| KR | 20180133142 A | 12/2018 |

OTHER PUBLICATIONS

International Search Report for Application No. PCT/KR2019/017406, dated Apr. 30, 2020, 2 pages.
Search Report dated Sep. 16, 2022 from the Office Action for Chinese Application No. 201911276715.9 dated Sep. 21, 2022, pp. 1-2.
European Search Report for Application No. 19900132.2 dated Jul. 8, 2021. 2 pgs.
Search Report dated Apr. 20, 2022 from the Office Action for Chinese Application No. 201911276715.9 dated Apr. 25, 2022, pp. 1-2.

* cited by examiner

BATTERY CELL CONNECTOR AND BATTERY CELL STRUCTURE INCLUDING BATTERY CELLS CONNECTED TO EACH OTHER USING THE SAME

CROSS-REFERENCE TO RELATED APPLICATIONS

This application is a national phase entry under 35 U.S.C. § 371 of PCT/KR2019/017406, filed on Dec. 10, 2019, and claims the benefit of priority to Korean Patent Application No. 10-2018-0164151 filed on Dec. 18, 2018, the disclosures of which are hereby incorporated by reference herein in their entirety.

BACKGROUND ART

Existing gasoline and diesel vehicles, which use fossil fuels, have been pointed out as major air polluters. Interest in electric vehicles, hybrid electric vehicles, and plug-in hybrid electric vehicles has increased as alternatives to existing gasoline and diesel vehicles. A high-capacity secondary battery for vehicles also has been actively researched and developed as a power source for the same.

With improvement in functions of portable electronic devices, a demand for the high-capacity secondary battery has also been increased in the mobile field. In order to increase voltage of a secondary battery, a structure, such as a battery pack, is required. In order to constitute a battery pack, a battery pack case, an electrical connection member, etc. are necessary; however, the weight of the battery pack is increased.

For a cylindrical secondary battery, batteries having standardized sizes are used, whereby it is difficult to freely design a battery pack.

Patent Document 1 discloses a battery cell having a plurality of connection units configured to connect the battery cell to other battery cells, wherein each of the connection units includes a concave portion provided in one side surface of the battery cell and a concave portion provided at the opposite side surface of the battery cell.

Patent Document 1 discloses a structure capable of increasing capacity of the battery cell through a hook structure provided at one side surface and the opposite side surface of the battery cell, but does not disclose a structure capable of increasing voltage of the battery cell.

Patent Document 2 discloses a battery pack for vehicles configured to have a structure in which a connection unit is formed on a side surface of each prismatic battery cell and in which battery cells adjacent to each other in a plane are connected to each other via the connection unit.

Patent Document 2 discloses a structure in which the prismatic battery cells are mounted in the same plane, but does not disclose a structure in which cylindrical secondary batteries are freely connected to each other in series and in parallel.

Patent Document 3 discloses an extensible auxiliary battery having an assembly type block structure including a box-shaped main block having an insertion recess formed in the lower surface thereof and an insertion protrusion formed on the upper surface thereof and an extension block having a corresponding recess and a corresponding protrusion of the same dimensions as the insertion recess and the insertion protrusion of the main block formed at the lower surface and the upper surface thereof.

Patent Document 3 discloses a structure in which parallel connection is achieved in the main block, but does not disclose a structure capable of connecting individual battery cells to each other in parallel.

Therefore, there is high necessity for a battery cell structure which is capable of using conventional secondary batteries without change, which is capable of being modified in various forms, and which is capable of being designed so as to have a desired voltage.

RELATED ART DOCUMENT

Korean Patent Application Publication No. 2011-0037543 (2011 Apr. 13)

Japanese Patent Application Publication No. 2002-352786 (2002 Dec. 6)

Korean Patent Application Publication No. 2018-0037409 (2018 Apr. 12)

DISCLOSURE

Technical Problem

The present invention has been made in view of the above problems, and it is an object of the present invention to provide a high-voltage, high-capacity battery cell structure capable of being configured in various forms using conventional battery cells and a battery cell connector capable of assembling the battery cell structure.

Technical Solution

In accordance with an aspect of the present invention, the above and other objects can be accomplished by the provision of a battery cell connector generally formed so as to have a hexahedral shape, the battery cell connector including a lower mounting unit formed in an upper surface thereof, the lower mounting unit being configured to mount a lower part of a cylindrical battery cell; an upper mounting unit formed in a lower surface thereof, the upper mounting unit being configured to mount an upper part of another cylindrical battery cell; and a connection unit formed at a front surface, a rear surface, a left surface, and a right surface thereof, the connection unit being configured to electrically and physically connect the battery cell connector to another battery cell connector, wherein the lower mounting unit, the upper mounting unit, and the connection unit are electrically connected to each other in the battery cell connector.

The interior of each of the lower mounting unit and the upper mounting unit may be formed so as to have the shape of a circular recess, and each of the lower mounting unit and the upper mounting unit may be provided in the interior thereof with a means configured to fix a cylindrical battery cell mounted thereto.

Each of the lower mounting unit and the upper mounting unit may be provided on an inner sidewall thereof with a protruding structure configured to fix a cylindrical battery cell mounted thereto.

The protruding structure may be formed so as to have a continuous shape or a discontinuous shape.

A non-slip material may be added to an inner sidewall of the circular recess.

The upper mounting unit may be provided in the interior thereof with a slit mounting unit configured to fix a cylindrical battery cell having a fixing slit formed therein.

The fixing slit may be a horizontal slit or an inclined slit.

The connection unit may include concave portions (ㅂ) and convex portions (ᄀ), and the concave portions and convex portions may be configured to be coupled to corresponding convex portions and corresponding concave portions of another battery cell connector, whereby battery cell connectors are continuously connected to each other in a forward direction, a rearward direction, a leftward direction, and a rightward direction so as to be extensible through the concave portions and the convex portions.

In accordance with another aspect of the present invention, there is provided a battery cell structure including battery cells connected to each other via the battery cell connector.

BEST MODE

Hereinafter, preferred embodiments of the present invention will be described in detail with reference to the accompanying drawings such that the preferred embodiments of the present invention can be easily implemented by those skilled in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that the other elements may be further included unless mentioned otherwise.

Embodiments of the present invention will be described in detail with reference to the accompanying drawings.

Figure 1:
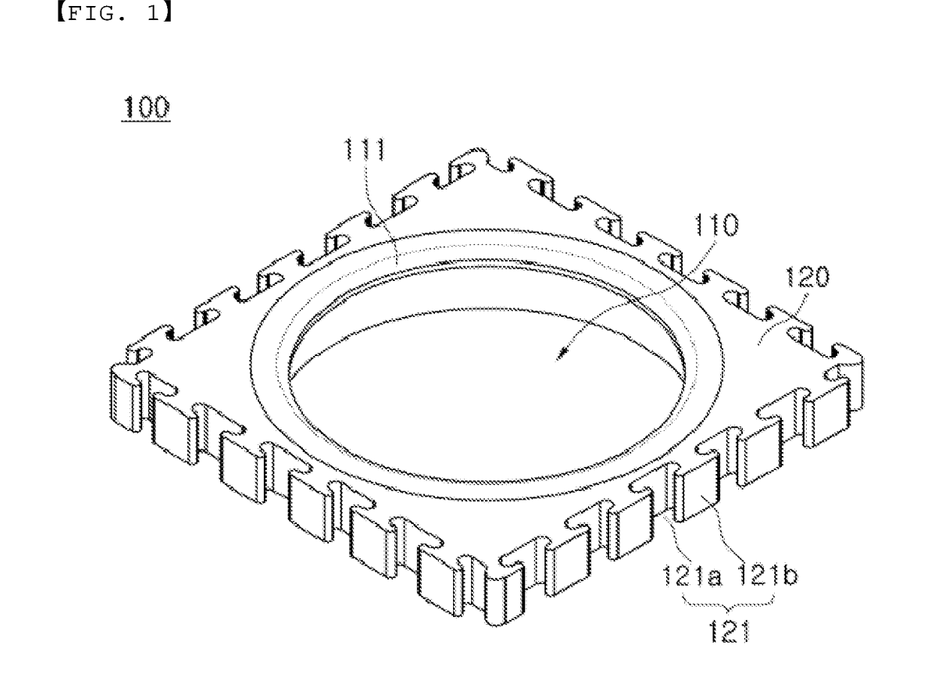
FIG. 1 is a top perspective view of a battery cell connector according to a first embodiment.
Figure 2:
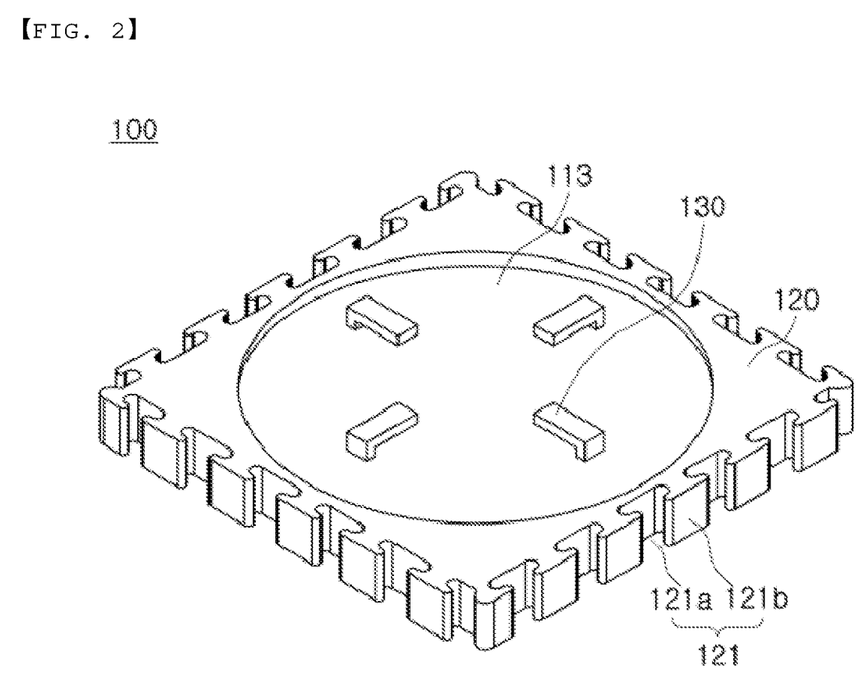
FIG. 2 is a bottom perspective view of the battery cell connector according to the first embodiment.

FIG. 1 is a top perspective view of a battery cell connector according to a first embodiment, and FIG. is a bottom perspective view of the battery cell connector according to the first embodiment.

Referring to FIGS. 1 and 2, the battery cell connector 100 is generally formed so as to have a hexahedral shape, and is configured to have a structure in which a lower mounting unit 110, in which the lower part of a cylindrical battery cell is mounted, is formed in the upper surface of the battery cell connector, in which an upper mounting unit 113, in which the upper part of another cylindrical battery cell is mounted, is formed in the lower surface of the battery cell connector, and in which a connection unit 120, which is configured to electrically and physically connect the battery cell connector to another battery cell connector, is formed at the edge of the battery cell connector.

The battery cell connector 100 may be made of a conductive material as long as the conductive material does not cause short circuit. Alternatively, the lower mounting unit 110, the upper mounting unit 113, and the connection unit 120 may include a connection part electrically connected to the inside of the battery cell connector 100, and the connection part may be electrically connected to a plurality of battery cells while being connected to electrode terminals of the cylindrical battery cell.

The interior of each of the lower mounting unit 110 and the upper mounting unit 113 is formed so as to have the shape of a circular recess, and a protruding structure 111 configured to fix a cylindrical battery cell is formed on the inner sidewall of the lower mounting unit 110.

The protruding structure 111 of FIG. 1 is formed so as to have a continuous shape, such as a ring shape.

A connection structure 121, in which concave portions 121a and convex portions 121b are alternately formed, is formed at the connection unit 120 such that the battery cell connector 100 is electrically connected to other battery cell connectors disposed in all directions, such as a forward direction, a rearward direction, a leftward direction, and a rightward direction, through the connection structure 121.

Consequently, as a plurality of battery cell connectors are connected in the horizontal direction through the connection unit and cylindrical battery cells are mounted in the lower mounting unit and/or the upper mounting unit of the plurality of battery cells, a battery cell structure, in which battery cells are connected to each other in parallel in the horizontal direction, may be formed.

A slit mounting unit 130 is configured to have a structure in which latch portions, which are configured to be coupled to a top cap of a cylindrical battery cell, are formed so as to be parallel to a bottom of the circular recess of the upper mounting unit 113.

Figure 3:
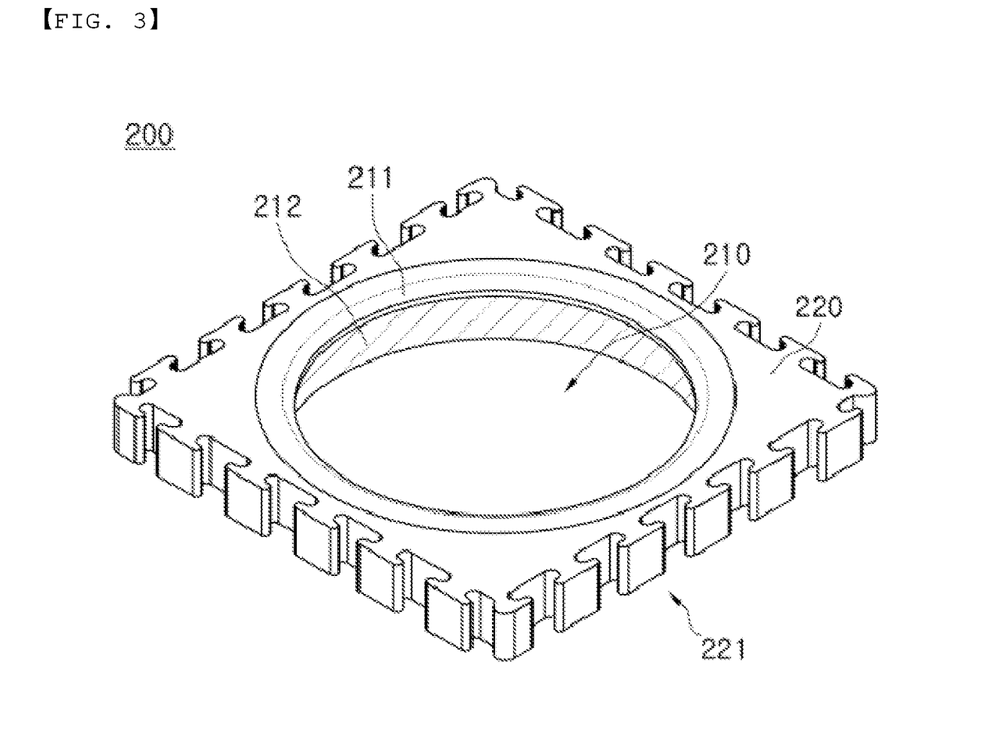
FIG. 3 is a top perspective view of a battery cell connector according to a second embodiment.
Figure 4:
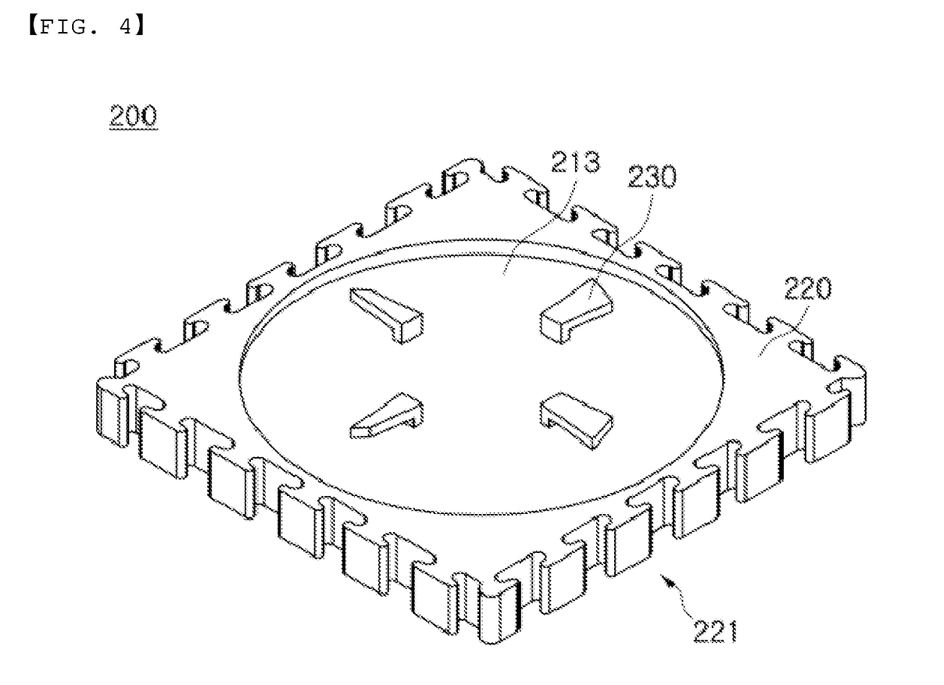
FIG. 4 is a bottom perspective view of the battery cell connector according to the second embodiment.

FIG. 3 is a top perspective view of a battery cell connector according to a second embodiment, and FIG. 4 is a bottom perspective view of the battery cell connector according to the second embodiment.

Referring to FIGS. 3 and 4, the battery cell connector 200 is generally formed so as to have a hexahedral shape, and is configured to have a structure in which a lower mounting unit 210, in which the lower part of a cylindrical battery cell is mounted, is formed in the upper surface of the battery cell connector, in which an upper mounting unit 213, in which the upper part of another cylindrical battery cell is mounted, is formed in the lower surface of the battery cell connector, and in which a connection unit 220, which is configured to electrically and physically connect the battery cell connector to another battery cell connector, is formed at the edge of the battery cell connector.

The interior of each of the lower mounting unit 210 and the upper mounting unit 213 is formed so as to have the shape of a circular recess, and a protruding structure 211 configured to fix a cylindrical battery cell is formed on the inner sidewall of the lower mounting unit 210.

A non-slip material 212 is added to the lower side of the protruding structure 211 as the inner sidewall of the circular recess. In the case in which a cylindrical battery cell is mounted in the circular recess, therefore, it is possible to prevent the cylindrical battery cell from being separated from the circular recess.

A connection structure 221, in which concave portions and convex portions are alternately formed, is formed at the connection unit 220 such that the battery cell connector 200 is electrically connected to other battery cell connectors disposed in all directions, such as a forward direction, a rearward direction, a leftward direction, and a rightward direction, through the connection structure 221.

A slit mounting unit 230 is configured to have a structure in which latch portions, which are configured to be coupled to a top cap of a cylindrical battery cell, are formed so as to be inclined with respect to a bottom of the circular recess of the upper mounting unit 213.

Although each of the slit mounting unit 130 and the slit mounting unit 230 has four latch portions, as shown in FIGS. 2 and 4, each of the slit mounting unit 130 and the slit mounting unit 230 may have three or more latch portions, which may be spaced apart from each other at the same interval in order to achieve stable coupling to a cylindrical battery cell.

Figure 5:
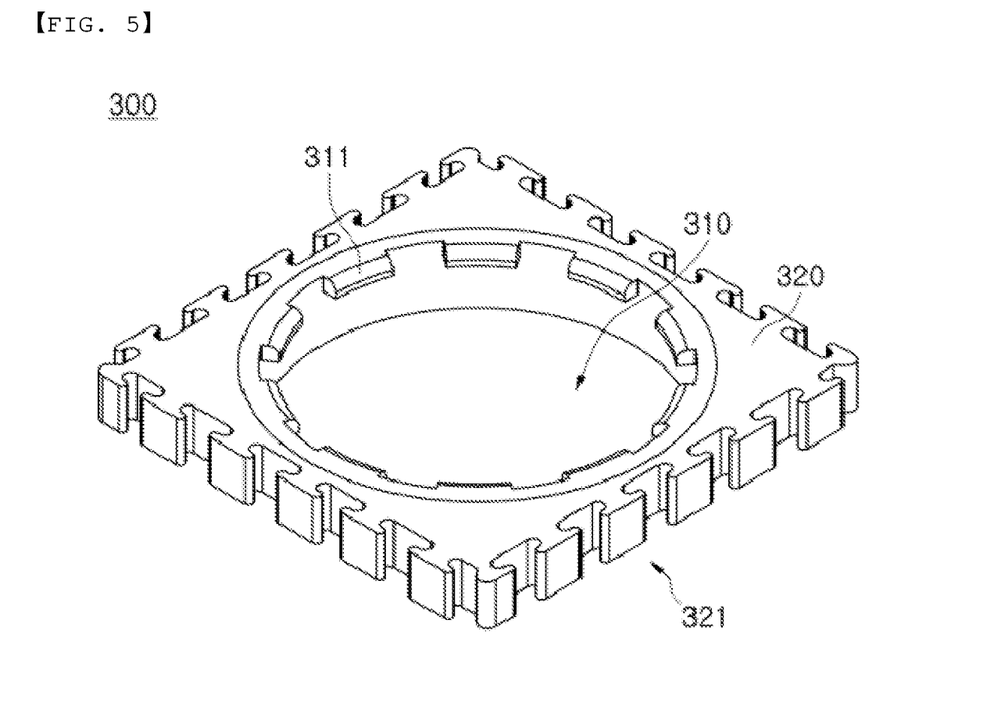
FIG. 5 is a top perspective view of a battery cell connector according to a third embodiment.
Figure 6:
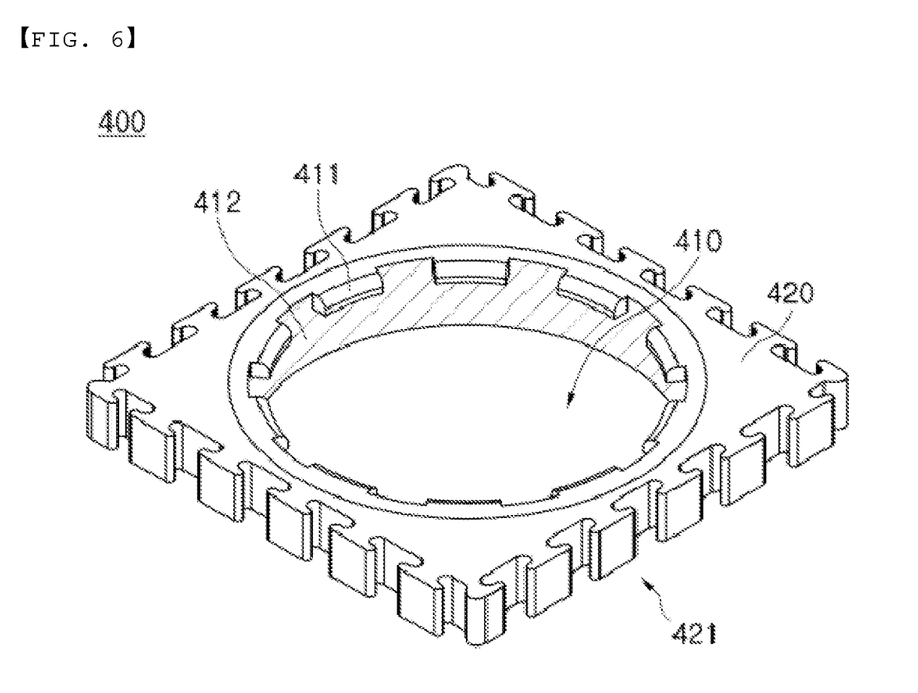
FIG. 6 is a top perspective view of a battery cell connector according to a fourth embodiment.

FIG. 5 is a top perspective view of a battery cell connector according to a third embodiment, and FIG. 6 is a top perspective view of a battery cell connector according to a fourth embodiment.

Referring to FIG. 5, the battery cell connector 300 is generally formed so as to have a hexahedral shape, and is configured to have a structure in which a lower mounting unit 310, in which the lower part of a cylindrical battery cell is mounted, is formed in the upper surface of the battery cell connector and in which a connection unit 320, which is provided with a connection structure 321 including concave portions and convex portions configured to electrically and physically connect the battery cell connector to another battery cell connector, is formed at the edge of the battery cell connector.

Protruding structures 311 configured to fix a cylindrical battery cell are formed on the inner sidewall of the lower mounting unit 310 of FIG. 5, and the protruding structures 311 are disposed so as to be spaced apart from each other.

Referring to FIG. 6, the battery cell connector 400 is generally formed so as to have a hexahedral shape, and is configured to have a structure in which a lower mounting unit 410, in which the lower part of a cylindrical battery cell is mounted, is formed in the upper surface of the battery cell connector and in which a connection unit 420, which is provided with a connection structure 421 including concave portions and convex portions configured to electrically and physically connect the battery cell connector to another battery cell connector, is formed at the edge of the battery cell connector.

A non-slip material 412 is added to the lower side of protruding structures 411, the protruding structures 411 configured to fix the cylindrical battery cell on the inner sidewall of a circular recess of the lower mounting portion 410. In the case in which a cylindrical battery cell is mounted in the circular recess, therefore, it is possible to prevent the cylindrical battery cell from being separated from the circular recess.

Figure 7:
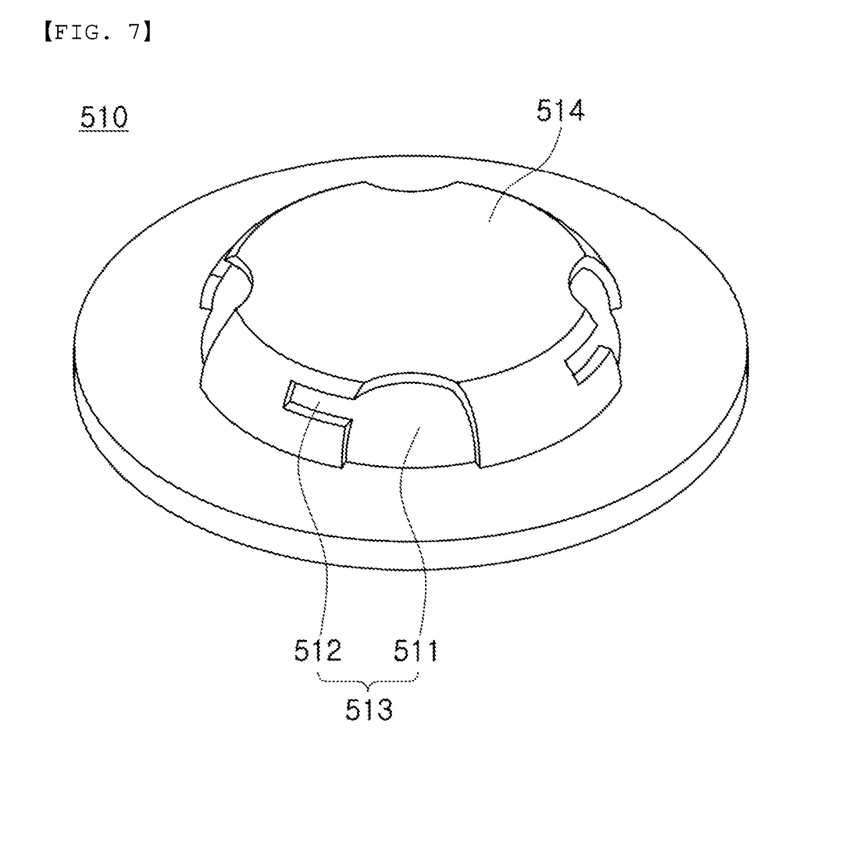
FIG. 7 is a perspective view of a top cap for battery cells according to a fifth embodiment.
Figure 8:
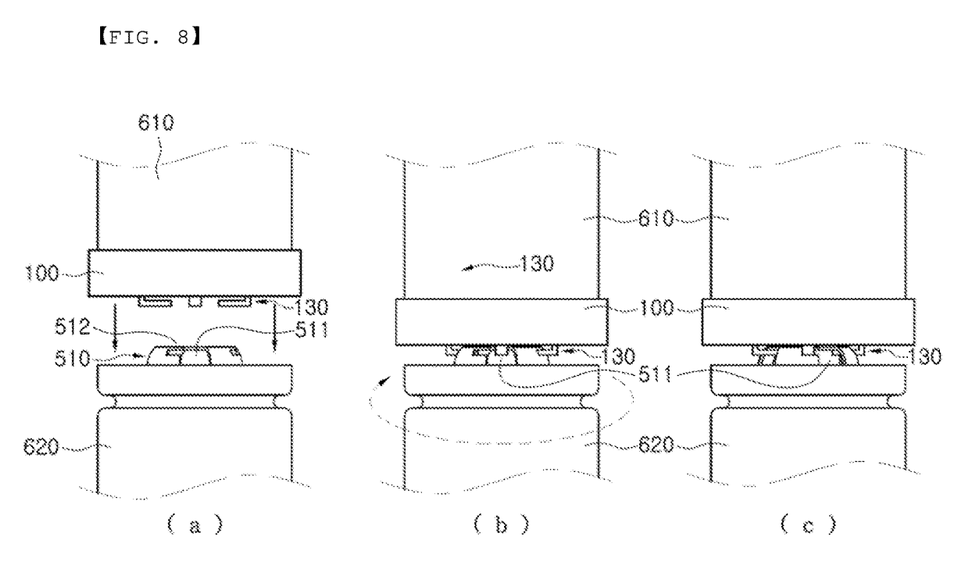
FIGS. 8(a)-8(c) are partial elevation views showing a process of forming a battery cell structure.

FIG. 7 is a perspective view of a top cap for battery cells according to a fifth embodiment, and FIG. 8 is a view showing a process of forming a battery cell structure.

Referring to FIGS. 7 and 8, the top cap 510 is provided on a central portion thereof with a protrusion 514, and a coupling unit 513, which includes through-holes 511, into which the latch portions of the slit mounting unit are inserted, and fixing slits 512, into which the latch portions of the slit mounting unit are fastened by sliding, is formed in the sidewall of the protrusion 514.

Each of the fixing slits 512 of FIG. 7 is a horizontal slit. Consequently, latch portions of a slit mounting unit configured to have a structure in which the latch portions, which are configured to be coupled to a top cap of a cylindrical battery cell, are formed so as to be parallel to a bottom of a circular recess of the upper mounting unit may be coupled into the respective fixing slits 512, like the slit mounting unit 130 of FIG. 2.

That is, as shown in FIG. 8(*a*), after a cylindrical battery cell 610 is mounted in the lower mounting unit of the battery cell connector 100, the battery cell connector 100 with the cylindrical battery cell 610 mounted is disposed on the upper surface of a top cap 510 of a cylindrical battery cell 620, which serves as a positive electrode terminal, in order to connect a negative electrode of the cylindrical battery cell 610 and a positive electrode of the cylindrical battery cell 620 to each other in series.

Subsequently, as shown in FIG. 8(*b*), the latch portions of the slit mounting unit 130 of the battery cell connector 100 are inserted into the through-holes 511 of the top cap 510, and then the battery cell connector 100 is rotated in a direction indicated by the dashed arrow.

As a result of the rotation, the latch portions of the slit mounting unit 130 are fastened into the respective fixing slits 512 by sliding. As shown in FIG. 8(*c*), therefore, the negative electrode of the cylindrical battery cell 610 and the positive electrode of the cylindrical battery cell 620 are electrically connected to each other through the battery cell connector.

Figure 9:
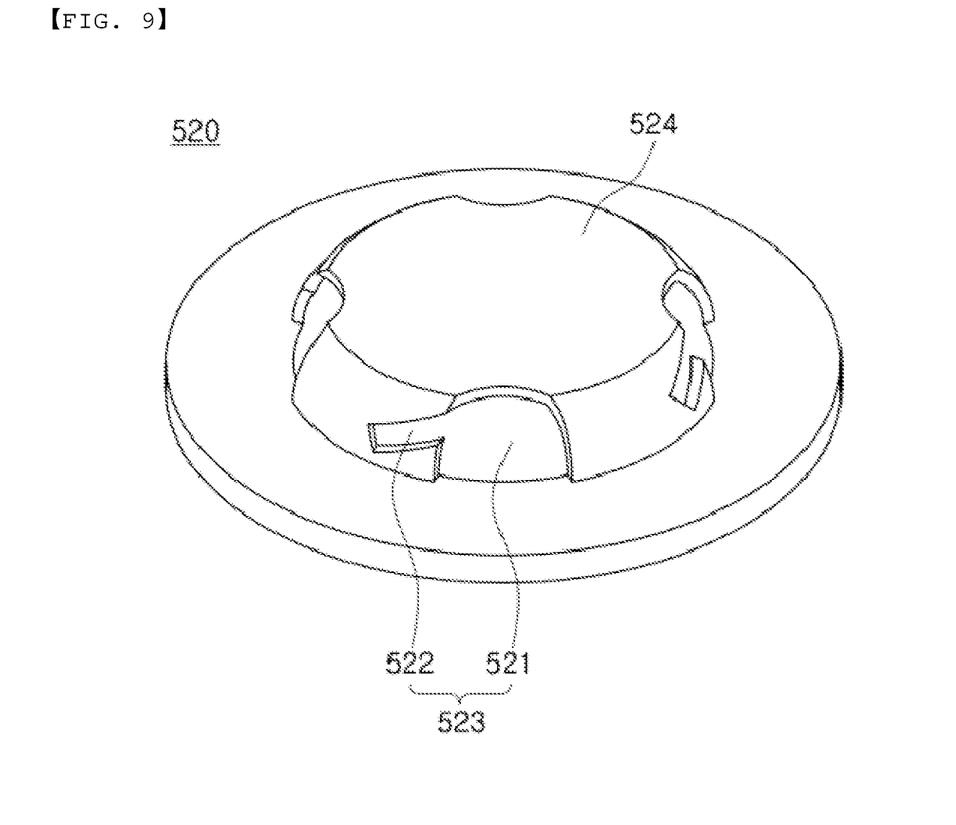
FIG. 9 is a perspective view of a top cap for battery cells according to a sixth embodiment.

FIG. 9 is a perspective view of a top cap for battery cells according to a sixth embodiment.

Referring to FIG. 9, the top cap 520 is provided on a central portion thereof with a protrusion 524, and a coupling unit 523, which includes through-holes 521, into which the latch portions of the slit mounting unit are inserted, and fixing slits 522, into which the latch portions of the slit mounting unit are fastened by sliding, is formed in the sidewall of the protrusion 524.

Unlike the fixing slits 512 of FIG. 7, each of the fixing slits 522 of FIG. 9 is an inclined slit. Consequently, latch portions of a slit mounting unit configured to have a structure in which the latch portions, which are configured to be coupled to a top cap of a cylindrical battery cell, are formed so as to be inclined with respect to a bottom of a circular recess of the upper mounting unit may be coupled into the respective fixing slits 522, like the slit mounting unit 230 of FIG. 4.

In the case in which the fixing slits 522 having the above-described structure are used, it is possible to effectively prevent the latch portions of the slit mounting unit from being separated from the respective fixing slits 522.

Meanwhile, although not shown in the drawings, battery cells coupled to battery cell connectors are connected to each other in parallel through coupling between the battery cell connectors in the horizontal direction in order to manufacture a high-capacity battery cell structure.

In addition, the battery cells connected to each other in parallel may be disposed so as to have a layered structure in the state in which the battery cells connected to each other in parallel such that the upper-layer battery cells and the lower-layer battery cells are connected to each other in series. In the case in which the layered structure is repeatedly formed, it is possible to manufacture a high-voltage battery cell structure.

Since a battery cell connector having a simple structure is used, as described above, it is possible to easily manufacture a high-voltage, high-capacity battery cell structure using conventional cylindrical battery cells.

Although the preferred embodiments of the present invention have been described by way of illustration, the scope of the present invention is not limited to the specific embodiments described herein, and the present invention can be appropriately modified within the category described in the claims.

DESCRIPTION OF REFERENCE SYMBOLS 100, 200, 300, 400: Battery cell connectors
110, 210, 310, 410: Lower mounting units
111, 211, 311, 411: Protruding structures
113, 213: Upper mounting units
120, 220, 320, 420: Connection units
121a: Concave portions
121b: Convex portions
121, 221, 321, 421: Connection structures
130, 230: Slit mounting units
212, 412: Non-slip materials
510, 520: Top caps
511, 521: Through-holes
512, 522: Fixing slits
513, 523: Coupling units
514, 524: Protrusions
610, 620: Cylindrical battery cells

INDUSTRIAL APPLICABILITY

As is apparent from the above description, the battery cell connector according to the present invention is configured to have a structure to which conventional battery cells can be directly applied.

In addition, the battery cell connector can be used in order to connect a plurality of battery cells to each other in parallel as well as in series.

In addition, it is possible to manufacture battery cell structures having various forms using the battery cell connector.

In addition, it is possible to easily manufacture a high-voltage and/or high-capacity battery cell structure.

The invention claimed is:

1. A battery cell connector formed so as to have a generally hexahedral shape, the battery cell connector comprising:
   a lower mounting unit defining a recess ending in a solid bottom surface, the lower mounting unit formed in an upper surface of the battery cell connector, the lower mounting unit being configured to mount a lower part of a cylindrical battery cell in contact with the solid bottom surface;
   an upper mounting unit defining a recess ending in a solid top surface, the upper mounting unit formed in a lower surface of the battery cell connector, the upper mounting unit being configured to mount an upper part of another cylindrical battery cell in contact with the solid top surface; and
   a connection unit formed at a front surface, a rear surface, a left surface, and a right surface of the battery cell connector, the connection unit being configured to electrically and physically connect the battery cell connector to another battery cell connector, the connection unit having an electrical connection part extending therein, the electrical connection part being configured to be electrically connected to an adjacent battery cell connector, wherein
   the lower mounting unit, the upper mounting unit, and the connection unit are electrically connected to each other through the electrical connection part extending within the battery cell connector.

2. The battery cell connector according to claim 1, wherein
   the recess of each of the lower mounting unit and the upper mounting unit have a circular shape, and
   each of the lower mounting unit and the upper mounting unit is provided in the interior of the battery cell connector and configured to fix a cylindrical battery cell mounted thereto.

3. The battery cell connector according to claim 1, wherein the lower mounting unit includes a protruding structure provided on an inner sidewall of the battery cell connector configured to fix a cylindrical battery cell mounted thereto.

4. The battery cell connector according to claim 3, wherein the protruding structure is formed so as to have a continuous shape or a discontinuous shape.

5. The battery cell connector according to claim 2, wherein a non-slip material is added to an inner sidewall of the circular recess.

6. The battery cell connector according to claim 1, wherein the upper mounting unit is provided in an interior of the battery cell connector with a slit mounting unit configured to fix a cylindrical battery cell having a fixing slit formed therein.

7. The battery cell connector according to claim 6, wherein the fixing slit is a horizontal slit or an inclined slit.

8. The battery cell connector according to claim 1, wherein the connection unit comprises concave portions and convex portions, and the concave portions and convex portions are configured to be coupled to corresponding convex portions and corresponding concave portions of another battery cell connector, whereby battery cell connectors are continuously connected to each other in a forward direction, a rearward direction, a leftward direction, and a rightward direction so as to be extensible through the concave portions and the convex portions.

9. A battery cell structure comprising battery cells connected to each other via the battery cell connector according to claim 1.

* * * * *